Feb. 3, 1970  M. A. VERNON-COLE  3,493,284
VARIABLE APERTURED RADIATING DIFFUSING INTEGRATING CAVITY
Filed Dec. 15, 1967  3 Sheets-Sheet 1

Michel A. Vernon-Cole
INVENTOR.

BY

Roy Miller
ATTORNEY

Feb. 3, 1970  M. A. VERNON-COLE  3,493,284
VARIABLE APERTURED RADIATING DIFFUSING INTEGRATING CAVITY
Filed Dec. 15, 1967  3 Sheets-Sheet 2

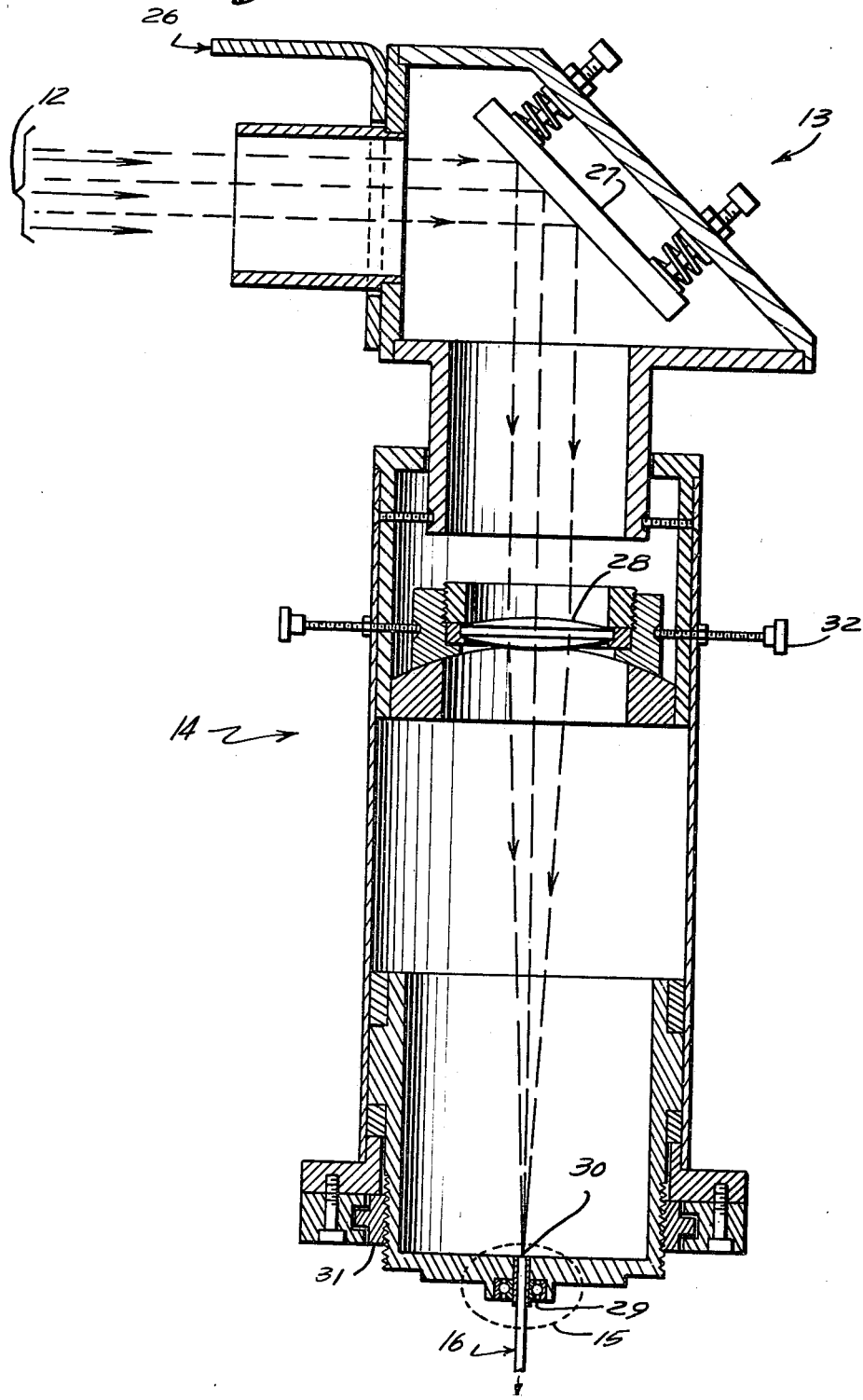

United States Patent Office 3,493,284
Patented Feb. 3, 1970

3,493,284
VARIABLE APERTURED RADIATING DIFFUSING INTEGRATING CAVITY
Michel A. Vernon-Cole, China Lake, Calif., assignor to the United States of America as represented by the Secretary of the Navy
Filed Dec. 15, 1967, Ser. No. 690,899
Int. Cl. G02b *17/00, 27/18*
U.S. Cl. 350—27                    5 Claims

ABSTRACT OF THE DISCLOSURE

A monochromatic spatially coherent light beam impinges upon a series of mirrors which fold and reflect the light beam through a diffusing cavity onto a converging lens and focuses the diffused beam onto a fiber optic conductor cooperating with a rotatable rate table for supporting and observing a gyro-stabilized missile.

GOVERNMENT INTEREST

The invention described herein may be manufactured and used by or for the Government of the United States of America for governmental purposes without the payment of any royalties thereon or therefor.

BACKGROUND OF THE INVENTION

One means for testing gyro stabilized guided missile trackers is to mount the missile upon a rate table which rotates at varying angular velocities. The "eye" of the missile is placed at the center line of the table so that the missile is "looking" at a virtual point source located at infinity. As the rate table rotates, the gyro stabilized missile tracker tends to remain in its initial position and the point source appears to move away from the position at which the missile was originally looking. Tracking response is tested by rotating the rate table at varying angular velocities to determine if the missile can follow the apparent infinite point source moving at the given angular speed.

One problem which arises when using such a rate table is how to simulate a finite point source viewed from the center line of the rate table. One solution is to mount a highly diffused light source on the rate table and use optics to create a virtual point source at infinity when viewed from the centerline of the table. However, a source with sufficient power to permit efficient operation generates electromagnetic radiation which interferes with the sensitive equipment used to measure the tracking ability of a missile. It is therefore desirable to transmit the light energy from a nearby room, where effective electromagnetic shielding prevents interference with equipment near the rate table, to the focal point of an optical system located on the table.

SUMMARY

In accordance with the present invention, a monochromatic spatially coherent light beam impinges upon a series of mirrors. The mirrors fold and reflect the light onto a converging lens which focuses it onto one end of a fiber optics conductor. The optical conductor directs the light into a spherical cavity which is located at the focal point of the rate table. The spherical cavity is coated with diffusing paint and has an aperture at one end. The diffused light emerges from the aperture via a light cone and the light in turn impinges upon a paraboloidal mirror which creates a virtual image on an infinite point source at the centerline of the rate table.

BRIEF DESCRIPTION OF THE DRAWING

FIG. 3 is a cross sectional view of the mirror and interface housing.

DESCRIPTION OF THE PREFERRED EMBODIMENT

Figure 1:
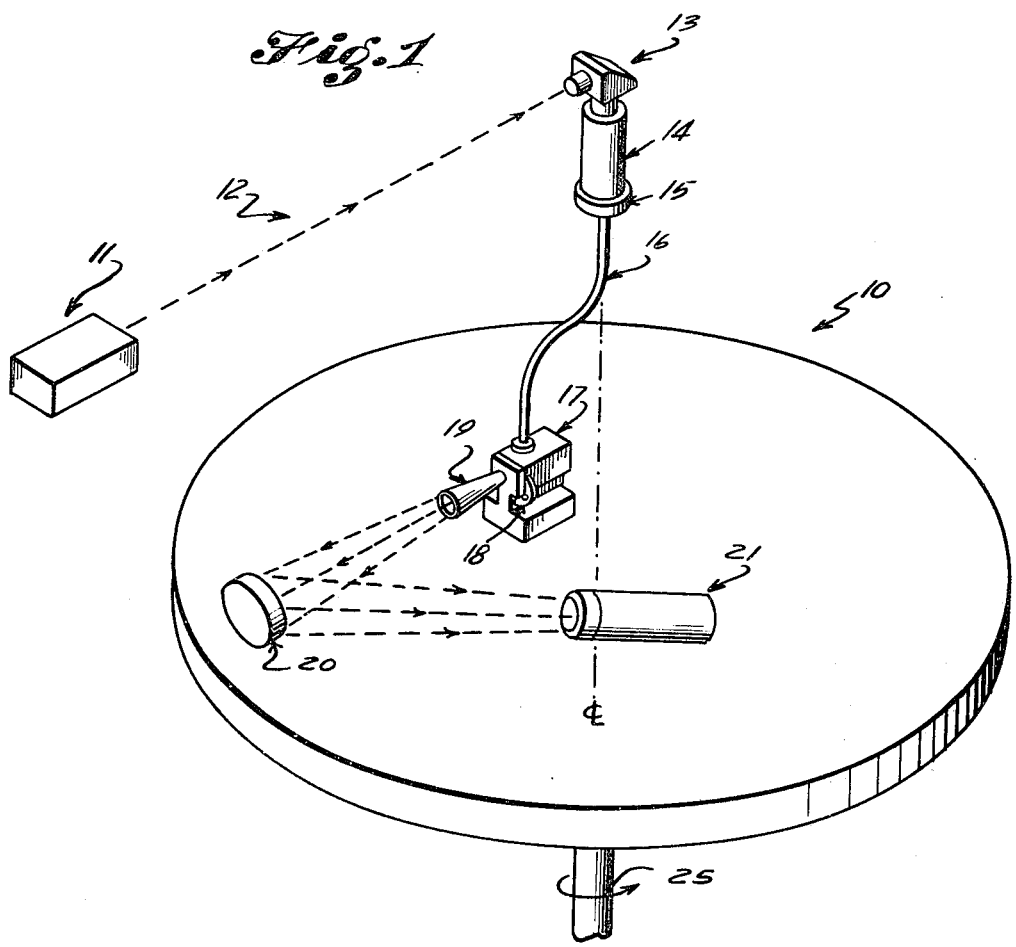
FIG. 1 shows a preferred embodiment of the invention.

In FIG. 1, a light beam 12 emerges from a source 11 into a light protective housing, not shown, which directs the beam onto a mirror assembly 13 located within an interface housing 14.

The mirror and interface housing 14 is shown in FIG. 3. The housing 14 is suspended from an overhead member by bracket 26. As light beam 12 enters the housing 14, it is folded 90° by mirror 27 and directed onto a converging lens 28. The lens 28 directs the converged beam onto the input face to fiber optics 30 which is located at the bottom of interface housing 14. The lateral position of converging lens 28 may be shifted by means of adjusting screws 32, and the distance from input face 30 to converging lens 28 may be changed to insure that the light beam converges exactly on input face 30. The interface housing is positioned so that fiber optic input face 30 is directly over the center line of rate table 10. A low drag ball bearing 29 permits the fiber optics 16 to swivel within the interface 15 so that the rate table 10 may rotate without twisting fiber optics 16.

Figure 2:
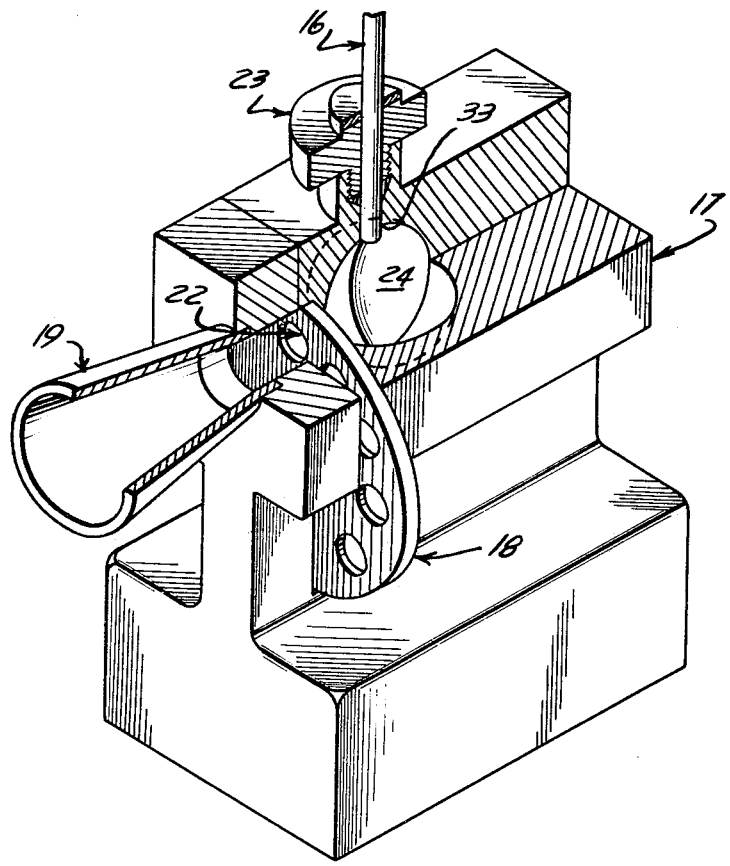
FIG. 2 shows the spherical cavity in partial cross section.

Spherical cavity 24 is located within a mounting block 17, and the block is fastened to the rate table at a focal point of the rate table. Fiber optics 16 directs the light from the interface 15 into diffusing cavity 24 at input port 33 and the fiber is secured to the mount 17 by a connector 23 as shown in FIG. 2. The output from the cavity 24 to the optics of the rate table is via an exit port located at a 90° angle to the input 33, a selectable aperture 22 and a cone 19. A paraboloidal reflector 20, placed at one edge of the rate table collimates and directs light emerging from the aperture 22, which is located at the focal point of the reflector 20, to the center line of the rate table 10. To eliminate any first reflection onto the output of the spherical cavity, the center line of the fiber bundle input port 33 is displaced forward of the center line of the spherical cavity 24 by one diameter of the fiber optic bundle 16. The surface of the spherical cavity 24 is treated to uniformly scatter incident light, for example, the surface of the cavity may be painted with a white velvety finish enamel. A rotatable selector wheel 18 positioned between the exit from cavity 24 and the cone 19 permits various diameter apertures to be placed in the path of the output light radiation to yield changing steps in power output and effective spot diameter. Cone 19 confines the radiation output within the optical path of the rate table to prevent scattering. The solid angle of the cone is selected so that the area subtended equals the collecting surface area of the collimating optics 20.

In operation a gyro-stabilized missile 21 is mounted on the rate table so that the input port to the missile is located at the centerline of the rate table. The paraboloidal reflector 20 collimates and directs the output radiation from the cavity onto the input port of the missile 21. The radiation appearing at the input port to the missile appears to the missile to be radiation from a diffused, finite point source.

In order to test the tracking ability of the missile 21, the rate table 10 is rotated in the direction 25 at a predetermined angular velocity. The tracking portion of missile 21 is mounted on a gyroscope. As rate table 10 rotates, the gyroscope acts to keep the tracking portion fixed in space as if the rate table were not rotating. The missile tracker attempts to follow the finite point source which now appears to be moving away from the initial aim direction. The ability of the tracker to follow the point source determines the effectiveness of the missile to track a target moving across its field of view.

It should be understood, of course, that the foregoing disclosure relates only to a preferred embodiment of the invention and that numerous modifications or alterations may be made therein without departing from the spirit and the scope of the invention.

What is claimed is:
1. An optical system comprising:
   a source of light having an output beam;
   a fiber optics bundle;
   means for directing said beam of light into the fiber optics bundle;
   a rotatable rate table;
   means for receiving said light emanating from said fiber optics bundle and directing the light orthogonal to the rotational center line of the rate table; and
   means for mounting a gyro-stabilized tracking means on the rotational center line of said rate table intercepting the path of said light; so that the tracking ability of the gyro-stabilized tracking means may be observed.

2. The system of claim 1 wherein said means for directing the beam of light into the fiber optics bundle comprises:
   a mirror placed at an angle 45° with respect to the incident beam of light to fold said light beam 90°;
   a converging lens to focus said folded light onto the input face of a fiber optics bundle;
   means for laterally shifting said converging lens to better direct said light onto said input to the fiber optics bundle; and
   means for changing the distance between said input face and the converging lens to insure that the light emerging from said lens converges at the input face to the fiber optics bundle.

3. The system of claim 2 wherein the means for receiving the light emanating from the fiber optics bundle and directing the light orthogonal to the rotational center line of the rate table comprises:
   a spherical cavity with an input and an output;
   said input being displaced forward of the center line of the spherical cavity by one diameter of a fiber optics bundle;
   a fiber optics bundle being fed into said input;
   means for selecting various apertures to control the amount of light emanating from said spherical cavity;
   means for diffusively coating the interior of said spherical cavity; and
   a cone to funnel the output from the cavity to confine the optical output within the optical path of said gyro-stabilized missile.

4. The system of claim 3 wherein the spherical cavity is coated with a white velvety finish enamel to cause diffusion.

5. The system of claim 4 wherein the means for mounting a gyro-stabilized tracking means on the rotational center line of the rate table further includes:
   a paraboloidal mirror placed at an edge of said rate table to create a virtual image of a finite point source when viewed from the rotational center line of said rate table.

References Cited

UNITED STATES PATENTS

| | | | |
|---|---|---|---|
| 1,967,541 | 7/1934 | Schoute | 350—25 X |
| 2,267,544 | 12/1941 | Wente | 350—190 X |
| 2,435,074 | 1/1948 | Fry | 350—49 X |
| 3,020,806 | 2/1962 | Castrucci | 350—27 X |

FOREIGN PATENTS

| | | |
|---|---|---|
| 552,568 | 12/1956 | Italy. |
| 447,177 | 12/1912 | France. |

PAUL R. GILLIAM, Primary Examiner

U.S. Cl. X.R.

350—25, 32, 49, 55, 81, 96